US012810211B2

(12) United States Patent
Clark et al.

(10) Patent No.: US 12,810,211 B2
(45) Date of Patent: Nov. 24, 2026

(54) SAMPLE AND EVENT CORPUS CURATION WITH REINFORCEMENT LEARNING

(71) Applicant: CrowdStrike, Inc., Sunnyvale, CA (US)

(72) Inventors: Dav Clark, Towson, MD (US); Arnd Korn, Berlin (DE)

(73) Assignee: CrowdStrike, Inc., Sunnyvale, CA (US)

( * ) Notice: Subject to any disclaimer, the term of this patent is extended or adjusted under 35 U.S.C. 154(b) by 0 days.

(21) Appl. No.: 19/036,930

(22) Filed: Jan. 24, 2025

(65) Prior Publication Data

US 2026/0220521 A1 Jul. 30, 2026

(51) Int. Cl.
*G06N 20/00* (2019.01)
*G06F 16/16* (2019.01)
*G06F 16/174* (2019.01)

(52) U.S. Cl.
CPC ............. *G06N 20/00* (2019.01); *G06F 16/16* (2019.01); *G06F 16/1748* (2019.01)

(58) Field of Classification Search
CPC ........ G06N 3/092; G06N 3/08; G06N 3/0895; G06N 3/09; G06N 3/091; G06N 3/098; G06N 3/0985; G06N 3/094
See application file for complete search history.

(56) References Cited

U.S. PATENT DOCUMENTS

2002/0099730 A1 * 7/2002 Brown .................... G06F 16/30 707/E17.058
2010/0082513 A1 * 4/2010 Liu ..................... H04L 63/1458 706/46

(Continued)

FOREIGN PATENT DOCUMENTS

CN 108388554 A * 8/2018 ........... G06F 16/337
CN 108830201 A * 11/2018 ......... G06K 9/00221

(Continued)

OTHER PUBLICATIONS

Lopez-Martin et al., "Application of Deep Reinforcement Learning to Intrusion Detection for Supervised Problems", 2020, Expert Systems with Applications, 141, pp. 1-15. (Year: 2020).*

(Continued)

*Primary Examiner* — Paulinho E Smith

(74) *Attorney, Agent, or Firm* — Womble Bond Dickinson (US) LLP

(57) ABSTRACT

A system and method of automating and optimizing corpus curation in a reinforcement learning setting for artificial intelligence applications. The method includes generating, based on a feature extractor, a set of state representations indicating features of a set of files. The method includes identifying, based on the set of state representations and a policy, a set of actions that are respectively associated with the set of files. The method includes selecting, based on the set of actions and from the set of files, a first subset of files to generate a training dataset including the first subset of files. The method includes generating, by a processing device, a prediction score based on an Artificial Intelligence (AI) model, theoretically trained using the training dataset, to detect events associated with the set of files. The method includes modifying the training dataset based on the prediction score to generate a modified training dataset.

16 Claims, 5 Drawing Sheets

(56) References Cited

U.S. PATENT DOCUMENTS

| | | | | |
|---|---|---|---|---|
| 2014/0223562 | A1* | 8/2014 | Liu | G06N 3/006 726/23 |
| 2018/0270126 | A1* | 9/2018 | Tapia | H04L 41/16 |
| 2019/0164080 | A1* | 5/2019 | Stefani | G06F 9/45558 |
| 2019/0272818 | A1* | 9/2019 | Fernandez | G10L 13/10 |
| 2020/0034751 | A1* | 1/2020 | Kobayashi | G06N 20/00 |
| 2020/0285898 | A1* | 9/2020 | Dong | G06F 18/24147 |
| 2021/0165708 | A1* | 6/2021 | Vijayaraghavan | G06N 3/04 |
| 2023/0169176 | A1* | 6/2023 | Lee | G06N 3/08 726/26 |
| 2024/0223587 | A1* | 7/2024 | Berger | G06N 20/00 |
| 2024/0357380 | A1* | 10/2024 | Vandikas | G06N 3/0455 |
| 2024/0411535 | A1* | 12/2024 | Ken-Kwofie | G06F 8/51 |
| 2025/0039194 | A1* | 1/2025 | Korn | H04L 63/1416 |
| 2025/0299059 | A1* | 9/2025 | Ahmed | G06N 3/045 |

FOREIGN PATENT DOCUMENTS

| | | | | | |
|---|---|---|---|---|---|
| CN | 110266647 | A | * | 9/2019 | H04L 61/1511 |
| CN | 112131206 | A | * | 12/2020 | G06F 11/3452 |
| CN | 112819874 | A | * | 5/2021 | G06N 3/045 |
| CN | 113672732 | B | * | 4/2024 | G06F 16/35 |
| EP | 2592559 | A1 | * | 5/2013 | G06F 16/152 |
| WO | WO-2018139947 | A1 | * | 8/2018 | H03M 7/6082 |
| WO | WO-2022038753 | A1 | * | 2/2022 | G06N 20/00 |
| WO | WO-2024151535 | A1 | * | 7/2024 | |

OTHER PUBLICATIONS

Pashaei et al., "Early Intrusion Detection System using Honeypot for Industrial Control Networks", 2022, Results in Engineering, vol. 16, pp. 1-13 (Year: 2022).*

Fan et al., "Learning What Data to Learn", Feb. 28, 2017, ArXiv, pp. 1-10. (Year: 2017).*

Settles, "Active Learning Literature Survey", Jan. 9, 2009, University of Wisconsin-Madison, pp. 1-47. (Year: 2009).*

Atti et al., "Application of Deep Reinforcement Learning (DRL) for Malware Detection", International Journal of Information Technology and Computer Engineering, May 2024, vol. 04 No. 03, pp. 23-35 (Year: 2024).*

Yang et al., "A Deep Learning and Reinforcement Learning Based System for Encrypted Network Malicious Traffic Detection", Apr. 2021, pp. 363-365 (Year: 2021).*

Sewak et al., "Deep Reinforcement Learning for Cybersecurity Threat Detection and Protection: A Review", Jun. 6, 2022, arXiv.com, pp. 1-30. (Year: 2022).*

Jiang et al., "Vision Language Pre-training by Contrastive Learning with Cross-Modal Similarity Regulation", Jul. 14, 2023, Proceedings of the 61st Annual Meeting of the Association for Computational Linguistics, vol. 1, pp. 14660-14679. (Year: 2023).*

Dustin Hurlbut, "Fuzzy Hashing for Digital Forensic Investigators", Jan. 9, 2009, AccessData, pp. 1-9 (Year: 2009).*

He et al., "Fuzzy Hashing on Firmwares Images: A Comparative Analysis", 2022, IEEE, pp. 45-50. (Year: 2022).*

Pang et al, "Slicing Through the Noise: Efficient Crash Deduplication via Trace Reconstruction and Fuzzy Hashing", Dec. 6, 2024, Electronics, pp. 1-13. (Year: 2024).*

Nelson Elhage, "Finding Near-Duplicates with Jaccard Similarity and MinHash", Jul. 3, 2024, pp. 1-12 (Year: 2024).*

Hur et al., "Packet Chunking for File Detection", Jun. 2023, IEEE ACM Transactions on Networking, vol. 31 No. 3, pp. 1202-1215 (Year: 2023).*

* cited by examiner

SAMPLE AND EVENT CORPUS CURATION WITH REINFORCEMENT LEARNING

TECHNICAL FIELD

The present disclosure relates to data processing, and more particularly, to systems and methods of a corpus curation with reinforcement learning system for automating and optimizing corpus curation in a reinforcement learning (RL) setting for Artificial Intelligence (AI) applications.

BACKGROUND

Corpus or training data is a collection of labeled examples or instances used to teach an AI model how to make predictions or decisions. It includes input data and the corresponding correct output, which the AI model uses to learn patterns and relationships. During training, the AI model processes this data, adjusting its internal parameters to minimize errors in its predictions. Once trained, the AI model can generalize from the training data to make accurate predictions on new, unseen data.

BRIEF DESCRIPTION OF THE DRAWINGS

The described embodiments and the advantages thereof may best be understood by reference to the following description taken in conjunction with the accompanying drawings.

These drawings in no way limit any changes in form and detail that may be made to the described embodiments by one skilled in the art without departing from the spirit and scope of the described embodiments.

DETAILED DESCRIPTION

Figure 1:
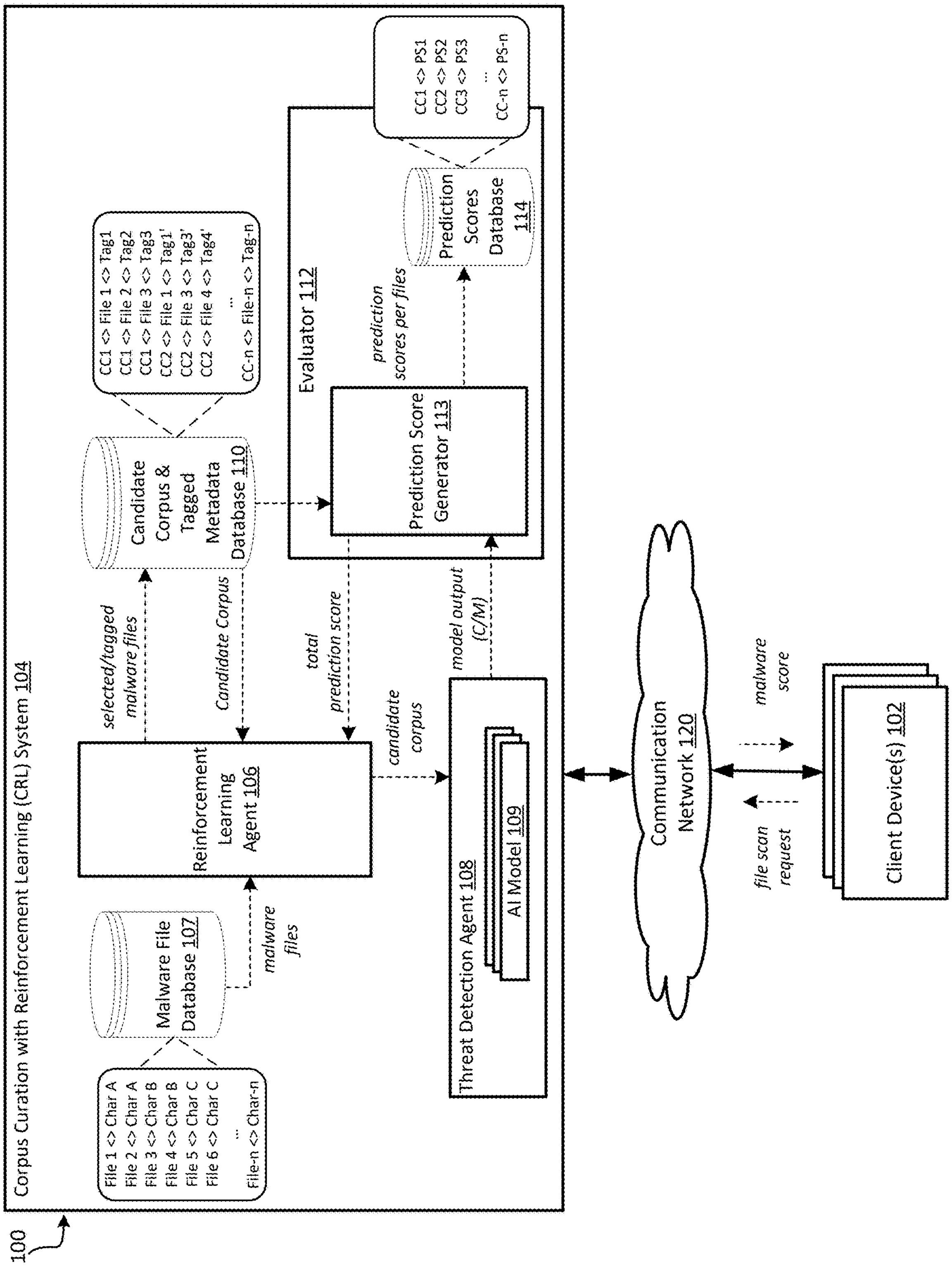
FIG. 1 is a block diagram depicting an example environment for automating and optimizing corpus curation in a RL setting for artificial intelligence applications, according to some embodiments.

Accumulating all samples (e.g., files) and events encountered in the wild (ITW) is impractical and adds too much noise and bias and not enough signal. As a result, supervised machine learning (ML) models like classification models trained on a sample set are more likely to perform better on over-represented populations and worse on smaller subsets. Moreover, as a corpus grows, there must be an effective way to manage the size of corpora used to train models.

Corpus quality remains a significant concern for models ranging from mature malware classifiers to innovative explorations into behavioral ML. Training a model on the full corpus of eligible samples yields sub-optimal results, including false positives (FPs). While approaches for optimizing model training are well-established, the problem of choosing a good set of examples (e.g., the training data) from the corpus to sufficiently represent the corpus remains labor intensive and highly exploratory. Thus, there is a long-felt but unsolved need to solve the problems of addressing the challenges of choosing a good set of examples (e.g., the training data) from the corpus to sufficiently represent the corpus.

Aspects of the present disclosure address the above-noted and other deficiencies by providing a corpus curation with reinforcement learning (CRL) system for automating and optimizing corpus (e.g., training data) curation in a RL setting for artificial intelligence applications, and while still allowing for human judgment in the process. The frame of RL provides a rigorous and ongoing process to evaluate the impact of a basket of existing and to-be-developed strategies for corpus curation. The task of taking a collection of samples or events (e.g., PE files or system logs) and obtaining "powerful" and "representative" subsets (e.g., for supervised ML model training and validation) while excluding other samples (e.g., too similar or redundant) can be solved by using an RL agent of the CRL system to process candidate samples or events for training a specific model and for each of them choosing an action from a predefined set of possibilities, for example, tag a sample as train/test/validate/exclude or submit to additional analysis like clustering, similarity, experimental feature extraction, human review etc. For a given model training iteration, the reinforcement algorithm would propose a small number of previously effective strategies (exploitation) as well as novel/modified strategies (exploration).

Additionally, a second RL agent (or the same agent) of the CRL system may be used to regularly (but infrequently) sweep across the entire corpus to date and choose an action to validate an existing tag or to exclude a sample (based on end-of-life characteristics) or to include the sample in a report to threat analysts and malware researchers on trends of growing or declining subpopulations. In both cases, a reward signal as well as cost metrics can be applied to increase or decrease the chance of a given strategy being proposed in subsequent rounds. Reward and cost may in some cases be possible to compute immediately, for example, derived from overall corpus size and variety/redundancy metrics. While other rewards may come at a later time, for example, by way of a reduction in analyst time spent reviewing recommendations and reports, and/or a reward in actual performance of one or more trained candidate models (whether in deployment or simulated customer environments).

Furthermore, the CRL system may perform deduplication and removal of similar samples (e.g., using a fuzzy hash like ssdeep together with a chosen similarity threshold value or an unsupervised clustering algorithm) and manual tagging with sub-populations (e.g., malware family or threat type such as miner, logger, loader, ransomware) can be employed to reduce the corpus size and to enrich the corpus with metadata, respectively. In addition, the CRL system may improve performance by removing "challenging" samples or sample types from the corpus—specifically those with a decision value (DV) close to the decision boundary of a previously trained model.

In an illustrative embodiment, a corpus curation with reinforcement learning (CRL) system generates, based on a policy (that provides a mapping from a state representation to one or more actions), a set of state representations indicating features (e.g., a file type, a file size, a file creation date, importing a particular library, containing a particular set of machine instructions at particular locations, information indicating that code was compiled by a particular compiler, etc.) of a set of files. The CRL system identifies based on the set of state representations, a set of actions that are respectively associated with the set of files. The CRL system selects, based on the set of actions and from the set of files, a first subset of files to generate a training dataset including the first subset of files. The CRL system generates a prediction score based on an AI model, theoretically trained using the training dataset, to detect events (e.g., malware, fraud, impersonations, etc.) associated with the set of files, which can be a useful approach to avoid wasting resources to actually train the AI model. However, in other embodiments, the CRL system generates a prediction score based on an AI model that is actually trained using the training dataset to detect events associated with the set of files.

The CRL system then modifies the training dataset based on the prediction score to generate a modified training dataset. However, in some embodiments, instead of generating a modified training dataset, the CRL system generates a second training data that includes the modified training dataset but not the training dataset.

Importantly, the present embodiments use reinforcement learning to gather and curate samples or events based on their information value and relevance. This approach not only aids in supervised ML model training and validation, but also provides actionable insights for event detection, such as threat analysts and malware researchers.

Although the present disclosure refers to malware detection in describing the present embodiments, any of the present embodiment may be modified to detect and/or classify several types of events, such as malware events, fraud events, impersonation events, and/or the like.

FIG. 1 is a block diagram depicting an example environment for automating and optimizing corpus curation in a RL setting for artificial intelligence applications, according to some embodiments. Environment 100 includes a corpus curation with reinforcement learning (CRL) system 104 and client devices 102 that are each communicably coupled together via a communication network 120. The CRL system 104 includes a reinforcement learning agent (RLA) 106, a threat detection agent 108, and an evaluator 112. The threat detection agent 108 includes AI models 109 in which the threat detection agent 108 may respectively train, using one or more sets of training data, to detect malware (e.g., malicious code designed to disrupt, damage, or gain unauthorized access to computer systems) in text files, image files, executable files, video files, and/or the like.

The evaluator 112 includes a prediction score generator 113 that is configured to generate a prediction score based on a theoretical version of the AI model 109 that is theoretically trained using the training dataset to detect malware in the set of files, which can be a useful approach to avoid wasting resources to actually train the AI model 109. However, in other embodiments, the CRL system generates a prediction score based on the AI model 109 that is actually trained using the training dataset to detect malware in the set of files.

The CRL system 104 includes a plurality of databases that are configured to store different datasets. Specifically, the CRL system 104 includes a malware file database 107 that is configured to store a mapping between a plurality of files and a plurality of file characters, where each file is associated with one or more file characters. In some embodiments, each mapping may also be a mapping between events, identities, assets, and a digital representation of the entity (e.g., "process rollup" includes details about a whole chain of executions). The CRL system 104 may use this information to classify several types of malware, fraud events, and/or impersonation events.

The CRL system 104 also includes a candidate corpus & tagged metadata database 110 that is configured to store a mapping between a plurality of candidate corpuses (e.g., training datasets), a plurality of files, and a plurality of files tags, where each candidate corpus includes a unique set of files that are each associated with its own file tag. The CRL system 104 also includes a candidate corpus & tagged metadata database 110 that is configured to store a mapping between each candidate corpus and its own prediction score. Each prediction score indicates an accuracy of an AI model theoretically trained with the candidate corpus to detect malware in a particular file. In some embodiments, each database may instead correspond to a flat file or a memory location/range.

The following numbered operations for the RLA 106 to process "sample" input (e.g., a file) uses language for samples such as suspicious or confirmed malware files. In a similar manner, cybersecurity event "samples" may be processed (e.g., memory dumps or more generally, dictionaries or key/value pairs such as command lines, process owner/permissions/duration, Operating System (OS) descriptors of resources allocated to the process such as file descriptors or handles and data sources or sinks):

In a first operation, the RLA 106 receives a sample file from an input stream or batch and preprocesses its metadata, such as extracting relevant features (e.g., file type, size, creation date) that can be used to make decisions.

In a second operation, based on the file's metadata, the RLA 106 extracts relevant features from other sources (e.g., internal/external databases, APIs) and combines them with the information available from the preprocessing step (e.g., concatenating all information or selecting the most informative ones for decision making).

In a third operation, the RLA 106 creates a state representation of the file based on its extracted features. This could involve using techniques like embedding or neural networks to compactly represent complex data.

In a fourth operation, the RLA 106 evaluates the policy space to identify possible actions (e.g., tagging for train/test/ignore or submitting for additional analysis) based on the state representation and the current policy. This could involve defining a reward function that assigns higher rewards to desirable outcomes (e.g., accurate classification, efficient processing).

In a fifth operation, the RLA 106 selects, based on the state representation and the possible actions, an action (e.g., tagging for train/test/validation/ignore or submitting for additional analysis) that maximizes the expected cumulative reward function over time (e.g., through multiple iterations). This could be done through exploration-exploitation tradeoffs, such as using epsilon-greedy strategies.

In a sixth operation, once an action is selected, the RLA 106 applies it to the file's metadata by adding tags (e.g., train, test, ignore) or assigning labels that indicate the file's suitability for additional analysis.

In a seventh operation, if an action selects submission for additional analysis, the RLA 106 might send the file to internal or external services (e.g., clustering APIs, compute-intensive or specialized feature extraction tools, human reviewers), receive results in real-time, and/or update its decision based on these new insights.

Lastly, the RLA 106 continuously updates its policy based on the prediction score by adapting to new data, receiving feedback from the downstream evaluator or model reviewer, and refining its actions for example, to optimize the overall performance of the classification model training process.

The evaluator 112 may evaluate a newly trained classification model (e.g., an AI model, a threat detection model, an event detection model, a fraud detection model, an impersonation detection model, etc.) in terms of multiple criteria, either in a standalone manner or in comparison to one or several previously trained models. The following provides several examples:

Predictive performance: Evaluate the model's ability to predict positive (malicious) or negative labels (clean file) correctly. Common metrics include accuracy, precision, recall, F1-score, Area Under the Receiver Operating Characteristic Curve (AUC-ROC).

False positive and false negative swap-in or swap-out: count (or proportion of) false positive or negative predictions compared to a prior classification model.

Performance on sub-populations, such as different file size groups, recency groups (e.g., file created in the last three/six/twelve months or earlier, known malware families etc.)

Computational speed: measure the time it takes to process a batch of files using the classification model, such as by measuring an average processing time per file, a total processing time for a batch of files, and/or a number of Central Processing Unit (CPU) cores or Graphical Processing Unit (GPU) utilized during processing.

Memory footprint: calculate the amount of memory used by the classification model during processing, such as calculating an average memory usage per file, a total memory usage for a batch of files, and/or a peak memory usage.

These evaluation metrics provide examples towards a comprehensive understanding of the model's performance, efficiency, and effectiveness in detecting malicious files. In some embodiments, the above measurements/calculations may be combined into a single aggregate reward or provide competing approaches to updates with multiple agents.

In some embodiments, each of the components (e.g., RLA 106, threat detection agent 108, evaluator 112) of the CRL system 104 may be housed into a single computing device (e.g., a server, a laptop, a desktop, etc.). However, in other embodiments, some or all of the components of the CRL system 104 may be included in separate computing device and/or database that are geographically/physically separate from one another. Similarly, each of the databases (e.g., malware file database 107, candidate corpus & tagged metadata database 110, prediction score database 114) may correspond to its own separate database that is geographically/physically separate from the servers and other databases.

The communication network 120 may be a public network (e.g., the internet), a private network (e.g., a local area network (LAN) or wide area network (WAN), or a combination thereof. In one embodiment, communication network 120 may include a wired or a wireless infrastructure, which may be provided by one or more wireless communications systems, such as Wi-Fi® connectivity to the communication network 120 and/or a wireless carrier system that can be implemented using various data processing equipment, communication towers (e.g., cell towers), etc. The communication network 120 may carry communications (e.g., data, message, packets, frames, etc.) between any other the computing device.

The CRL system 104 and client device 102 may each be any suitable type of computing device or machine that has a processing device, for example, a server computer (e.g., an application server, a catalog server, a communications server, a computing server, a database server, a file server, a game server, a mail server, a media server, a proxy server, a virtual server, a web server), a desktop computer, a laptop computer, a tablet computer, a mobile device, a smartphone, a set-top box, a graphics processing unit (GPU), etc. In some examples, a computing device may include a single machine or may include multiple interconnected machines (e.g., multiple servers configured in a cluster).

A computing device may be one or more virtual environments. In one embodiment, a virtual environment may be a virtual machine (VM) that may execute on a hypervisor which executes on top of an operating system (OS) for a computing device. The hypervisor may manage system sources (including access to hardware devices, such as processing devices, memories, storage devices). The hypervisor may also emulate the hardware (or other physical resources) which may be used by the VMs to execute software/applications. In another embodiment, a virtual environment may be a container that may execute on a container engine which executes on top of the OS for a computing device. For example, a container engine may allow different containers to share the OS of a computing device (e.g., the OS kernel, binaries, libraries, etc.). A computing device may use the same type or different types of virtual environments. For example, all of the computing devices may be VMs. In another example, all of the computing devices may be containers. In a further example, some of the computing devices may be VMs, other computing device may be containers, and other computing devices may be computing devices (or groups of computing devices).

Still referring to FIG. 1, the CRL system 104 generates, based on a feature extractor, a set of state representations indicating features (e.g., a file type, a file size, or a file creation date, etc.) of a set of files. The CRL system 104 identifies based on the set of state representations and the policy, a set of actions that are respectively associated with the set of files. The CRL system 104 selects, based on the set of actions and from the set of files, a first subset of files to generate a training dataset including the first subset of files. The CRL system 104 generates a prediction score based on an AI model 109, theoretically trained using the training dataset, to detect malware in the set of files, which can be a useful approach to avoid wasting resources to actually train the AI model 109. However, in other embodiments, the CRL system generates a prediction score based on the AI model 109 that is actually trained using the training dataset to detect malware in the set of files.

The CRL system 104 then modifies the training dataset based on the prediction score to generate a modified training dataset. However, in some embodiments, instead of generating a modified training dataset, the CRL system 104 generates a second training data that includes the modified training dataset but not the training dataset.

Although FIG. 1 shows only a select number of computing devices (e.g., CRL system 104, client devices 102); the environment 100 may include any number of computing devices that are interconnected in any arrangement to facilitate the exchange of data between the computing devices.

Figure 2A:
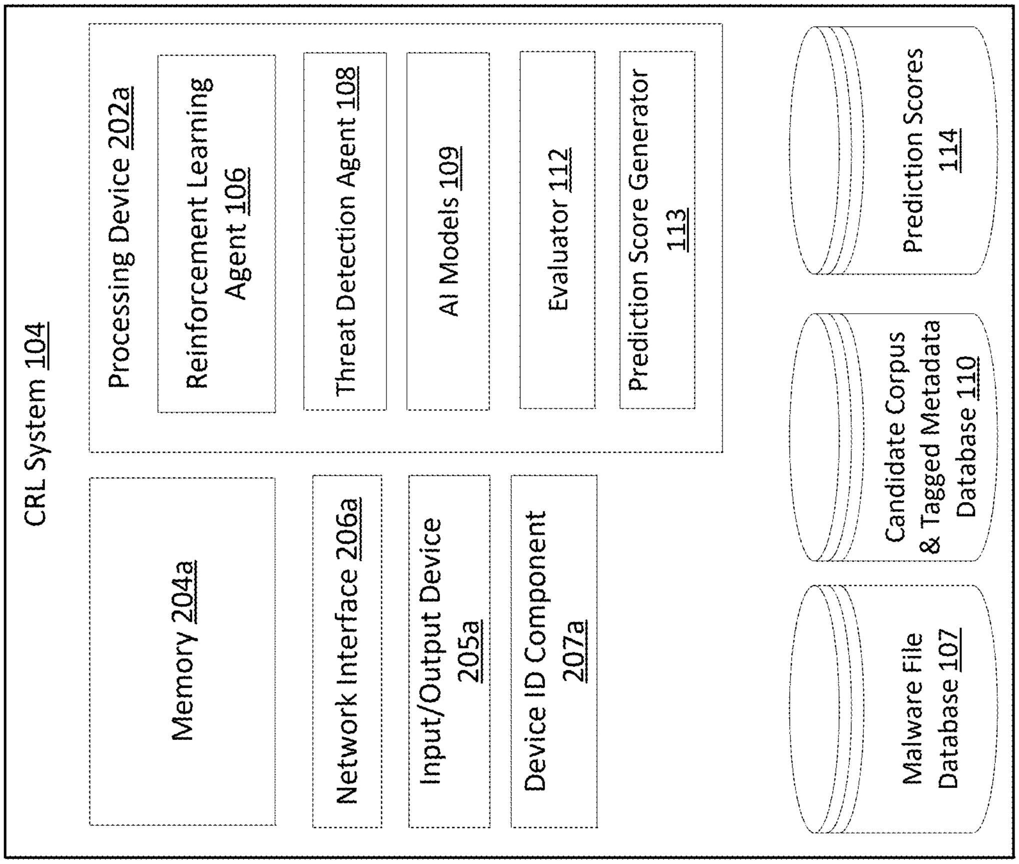
FIG. 2A is a block diagram depicting an example of the corpus curation with reinforcement learning (CRL) system of the environment in FIG. 1, according to some embodiments.

FIG. 2A is a block diagram depicting an example of the corpus curation with reinforcement learning (CRL) system of the environment in FIG. 1, according to some embodiments. While various devices, interfaces, and logic with particular functionality are shown, it should be understood that the CRL system 104 includes any number of devices and/or components, interfaces, and logic for facilitating the functions described herein. For example, the activities of multiple devices may be combined as a single device and implemented on the same processing device (e.g., processing device 402*a*), as additional devices and/or components with additional functionality are included.

The CRL system 104 includes a processing device 202*a* (e.g., general purpose processor, a Programmable Logic Device (PLD), etc.), which may be composed of one or more processors, and a memory 204*a* (e.g., synchronous dynamic random-access memory (DRAM), read-only memory (ROM)), which may communicate with each other via a bus (not shown).

The processing device 202*a* may be provided by one or more general-purpose processing devices such as a microprocessor, central processing unit, or the like. In some embodiments, processing device 202*a* may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202*a* may include one or more special-purpose processing devices such as an application specific integrated circuit (ASIC), a field programmable gate array (FPGA), a digital signal processor (DSP), network processor, or the like. The processing device 202*a* may be configured to execute the operations described herein, in accordance with one or more aspects of the present disclosure, for performing the operations and steps discussed herein.

The memory 204*a* (e.g., Random Access Memory (RAM), Read-Only Memory (ROM), Non-volatile RAM (NVRAM), Flash Memory, hard disk storage, optical media, etc.) of processing device 202*a* stores data and/or computer instructions/code for facilitating at least some of the various processes described herein. The memory 204*a* includes tangible, non-transient volatile memory, or non-volatile memory. The memory 204*a* stores programming logic (e.g., instructions/code) that, when executed by the processing device 202*a*, controls the operations of the CRL system 104. In some embodiments, the processing device 202*a* and the memory 204*a* form various processing devices and/or circuits described with respect to the CRL system 104. The instructions include code from any suitable computer programming language such as, but not limited to, C, C++®, C #®, Java®, JavaScript®, VBScript, Perl®, HTML, XML, Python®, TCL®, Golang®, GoScript®, and Basic.

The CRL system 104 includes a plurality of databases that are configured to store different datasets. Specifically, the CRL system 104 includes a malware file database 107 that the CRL system 104 uses to store a mapping between a plurality of files and a plurality of file characters, where each file is associated with one or more file characters. The CRL system 104 also includes a candidate corpus & tagged metadata database 110 that the CRL system 104 uses to store a mapping between a plurality of candidate corpuses (e.g., training datasets), a plurality of files, and a plurality of files tags, where each candidate corpus includes a unique set of files that are each associated with its own file tag. The CRL system 104 also includes a candidate corpus & tagged metadata database 110 that the CRL system 104 uses to store a mapping between each candidate corpus and its own prediction score. Each prediction score indicates an accuracy of an AI model theoretically trained with the candidate corpus to detect malware in a particular file. In some embodiments, each database may instead correspond to a flat file or a memory location/range.

The processing device 202 includes and/or executes an RLA agent 106, a threat detection agent 108, and an evaluator 112. The threat detection agent 108 includes and/or executes one or more AI models 109. As discussed herein, the threat detection model may be any type of classification model, such as a malware detection model, an event detection model, a fraud detection model, and impersonation detection model, and/or the like.

The RLA agent 106 may be configured to generate, based on a feature extractor, a set of state representations indicating features of a set of files. The RLA agent 106 may be configured to identify, based on the set of state representations and the policy, a set of actions that are respectively associated with the set of files. The RLA agent 106 may be configured to select, based on the set of actions and from the set of files, a first subset of files to generate a training dataset including the first subset of files. The evaluator 112 may be configured to generate a prediction score based on an AI model, theoretically trained using the training dataset, to detect malware in the set of files. The RLA agent 106 may be configured to modify the training dataset based on the prediction score to generate a modified training dataset.

The RLA agent 106 may be configured to modify the training dataset based on the prediction score by updating the policy based on the prediction score to generate an updated policy.

The RLA agent 106 may be configured to modify the training dataset based on the prediction score by generating, based on the updated policy, an updated set of state representations indicating updated features of the set of files; identifying, based on the updated set of state representations, an updated set of actions that are respectively associated with the set of files; and selecting, based on the updated set of actions and from the set of files, a second subset of files to generate the modified training dataset including the second subset of files.

The RLA agent 106 may be configured to modify the training dataset based on the prediction score by determining that a first file of the first subset of files is a duplicate file based on a second file of the first subset of files; and removing the first file from the training dataset.

The threat detection agent 108 may be configured to determine a first performance of the one or more AI models 109 based on the training dataset. The threat detection agent 108 may be configured to determine a second performance of the one or more AI models 109 based on the modified training dataset. The threat detection agent 108 may be configured to calculate a performance difference between the first performance and the second performance. The threat detection agent 108 may be configured to identify, based on the performance difference, at least one of a false positive or a false negative that are each associated with the training dataset.

The threat detection agent 108 may be configured to train, using a second training dataset, the one or more AI models 109 to detect malware in the set of files. The threat detection agent 108 may be configured to generate a second prediction score based on the one or more AI models 109. In these embodiments, The RLA agent 106 may be configured to modify the training dataset based on the prediction score and the second prediction score.

In some embodiments, the threat detection agent 108 may alternatively be a classification agent, such as a malware detection agent, an event detection agent, a fraud detection agent, an impersonation detection agent, and/or the like. In these embodiments, the classification model may be configured to train, using the appropriate datasets that are stored in the malware file database 107, its AI models 109 to classify files, events, assets, etc.

The RLA agent 106 may be configured to generate, based on a feature extractor, a set of state representations indicating features of a set of files by generating, for a first file of the first subset of files, one or more features. In some embodiments, a feature may be a file type, a file size, or a file creation date.

In some embodiments, an action may be to tag a particular file of the set of files with a training tag. In some embodiments, an action may be to tag the particular file of the set of files with a testing tag. In some embodiments, an action may be to tag the particular file of the set of files with an ignore tag. In some embodiments, an action may be to send the particular file of the set of files to one or more clustering Application Programming Interfaces (APIs) to generate additional information based on the particular file.

In some embodiments, the evaluator 112 may be configured to measure a processing time associated with the AI model to process the first subset of files. the evaluator 112 may be configured to calculate an amount of memory used by the AI model to process the first subset of files. In these embodiments, The RLA agent 109 may be configured to modify the training dataset based on the prediction score, the second prediction score, the processing time, and/or the amount of memory.

The CRL system 104 includes a network interface 206*a* configured to establish a communication session with a computing device for sending and receiving data over the communication network 120 to the computing device. Accordingly, the network interface 206A includes a cellular transceiver (supporting cellular standards), a local wireless network transceiver (supporting 802.11X, ZigBee®, Bluetooth®, Wi-Fi®, or the like), a wired network interface, a combination thereof (e.g., both a cellular transceiver and a Bluetooth® transceiver), and/or the like. In some embodiments, the CRL system 104 includes a plurality of network interfaces 206*a* of different types, allowing for connections to a variety of networks, such as local area networks (public or private) or wide area networks including the Internet, via different sub-networks.

The CRL system 104 includes an input/output device 205*a* configured to receive user input from and provide information to a user. In this regard, the input/output device 205*a* is structured to exchange data, communications, instructions, etc. with an input/output component of the CRL system 104. Accordingly, input/output device 205*a* may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of the CRL system 104, such as a built-in display, touch screen, microphone, etc., or external to the housing of the CRL system 104, such as a monitor connected to the CRL system 104, a speaker connected to the CRL system 104, etc., according to various embodiments. In some embodiments, the CRL system 104 includes communication circuitry for facilitating the exchange of data, values, messages, and the like between the input/output device 205*a* and the components of the CRL system 104. In some embodiments, the input/output device 205*a* includes machine-readable media for facilitating the exchange of information between the input/output device 205*a* and the components of the CRL system 104. In still another embodiment, the input/output device 205*a* includes any combination of hardware components (e.g., a touchscreen), communication circuitry, and machine-readable media.

The CRL system 104 includes a device identification component 207*a* (shown in FIG. 2A as device ID component 207*a*) configured to generate and/or manage a device identifier associated with the CRL system 104. The device identifier may include any type and form of identification used to distinguish the CRL system 104 from other computing devices. In some embodiments, to preserve privacy, the device identifier may be cryptographically generated, encrypted, or otherwise obfuscated by any device and/or component of the CRL system 104. In some embodiments, the CRL system 104 may include the device identifier in any communication (e.g., malware score, etc.) that the CRL system 104 sends to a computing device.

The CRL system 104 includes a bus (not shown), such as an address/data bus or other communication mechanism for communicating information, which interconnects the devices and/or components of the CRL system 104, such as processing device 202*a*, network interface 206*a*, input/output device 205*a*, and device ID component 207*a*.

In some embodiments, some or all of the devices and/or components of CRL system 104 may be implemented with the processing device 202*a*. For example, the CRL system 104 may be implemented as a software application stored within the memory 204*a* and executed by the processing device 202*a*. Accordingly, such embodiment can be implemented with minimal or no additional hardware costs. In some embodiments, any of these above-recited devices and/or components rely on dedicated hardware specifically configured for performing operations of the devices and/or components.

Figure 2B:
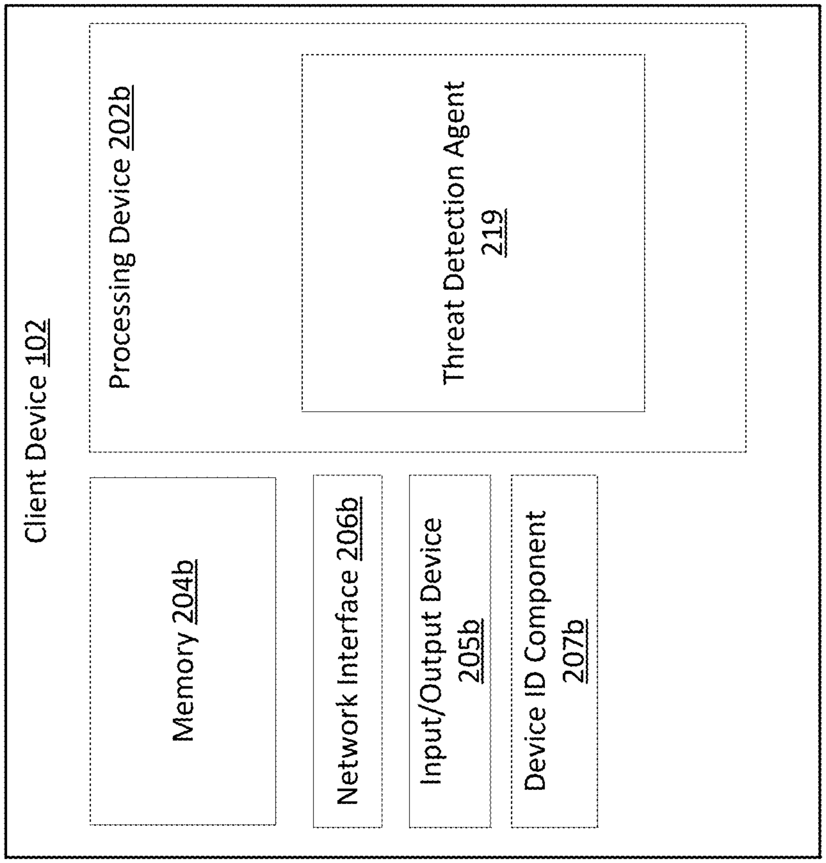
FIG. 2B is a block diagram depicting an example of the client device in FIG. 1, according to some embodiments.

FIG. 2B is a block diagram depicting an example of the client device in FIG. 1, according to some embodiments. While various devices, interfaces, and logic with particular functionality are shown, it should be understood that the client device 102 includes any number of devices and/or components, interfaces, and logic for facilitating the functions described herein. For example, the activities of multiple devices may be combined as a single device and implemented on a same processing device (e.g., processing device 202*b*), as additional devices and/or components with additional functionality are included.

The client device 102 includes a processing device 202*b* (e.g., general purpose processor, a PLD, etc.), which may be composed of one or more processors, and a memory 204*b* (e.g., synchronous dynamic random-access memory (DRAM), read-only memory (ROM)), which may communicate with each other via a bus (not shown). The processing device 202*b* includes identical or nearly identical functionality as processing device 202*a* in FIG. 2*a*, but with respect to devices and/or components of the client device 102 instead of devices and/or components of the CRL system 104.

The memory 204*b* of processing device 202*b* stores data and/or computer instructions/code for facilitating at least some of the various processes described herein. The memory 204*b* includes identical or nearly identical functionality as memory 204*a* in FIG. 2A, but with respect to devices and/or components of the client device 102 instead of devices and/or components of the CRL system 104.

The processing device 202*b* executes a threat detection agent 219 that is configured to send a file scan request to the CRL system 104 for the CRL system 104 to use its threat detection agent 108 and AI models 109 to scan a particular file for malware. The request may include the file (e.g., docs, pdf, exe, email, etc.) or may include information (e.g., file identifier, file location, URL) for the CRL system 104 to use to access the file. In response to receiving the request, the CRL system 104 may process the file as discussed here and generate a malware score indicating a likelihood of the file including malware. The CRL system 104 sends the malware score to the client device 102. Based on the malware score, the client device may decide that the file is safe or unsafe to open/execute.

In some embodiments, the threat detection agent 108 may be a universal classification agent that uses one or more AI models 109 that are trained to detect malware, events, assets, fraud, impersonation events, and/or the like. In these embodiments, the threat detection agent 219 of the client device 102 may be configured to send a request to the CRL system 104 for the CRL system 104 to use its classification agent and AI models 109 to detect and/or classify these types of events.

The client device 102 includes a network interface 206*b* configured to establish a communication session with a computing device for sending and receiving data over a network to the computing device. Accordingly, the network interface 206*b* includes identical or nearly identical functionality as network interface 206*a* in FIG. 2A, but with respect to devices and/or components of the client device 102 instead of devices and/or components of the CRL system 104.

The client device 102 includes an input/output device 205*b* configured to receive user input from and provide information to a user. In this regard, the input/output device 205*b* is structured to exchange data, communications, instructions, etc. with an input/output component of the client device 102. The input/output device 205*b* includes identical or nearly identical functionality as input/output device 205*a* in FIG. 2A, but with respect to devices and/or components of the client device 102 instead of devices and/or components of the CRL system 104.

The client device 102 includes a device identification component 207*b* (shown in FIG. 2B as device ID component 207*b*) configured to generate and/or manage a device identifier associated with the client device 102. The device ID component 207*b* includes identical or nearly identical functionality as device ID component 207*a* in FIG. 2A, but with respect to devices and/or components of the client device 102 instead of devices and/or components of the CRL system 104.

The client device 102 includes a bus (not shown), such as an address/data bus or other communication mechanism for communicating information, which interconnects the devices and/or components of the client device 102, such as processing device 202*b*, network interface 206*b*, input/output device 205*b*, and device ID component 207*b*.

In some embodiments, some or all of the devices and/or components of the client device 102 may be implemented with the processing device 202*b*. For example, the client device 102 may be implemented as a software application stored within the memory 204*b* and executed by the processing device 202*b*. Accordingly, such an embodiment can be implemented with minimal or no additional hardware costs. In some embodiments, any of these above-recited devices and/or components rely on dedicated hardware specifically configured for performing operations of the devices and/or components.

Figure 2C:
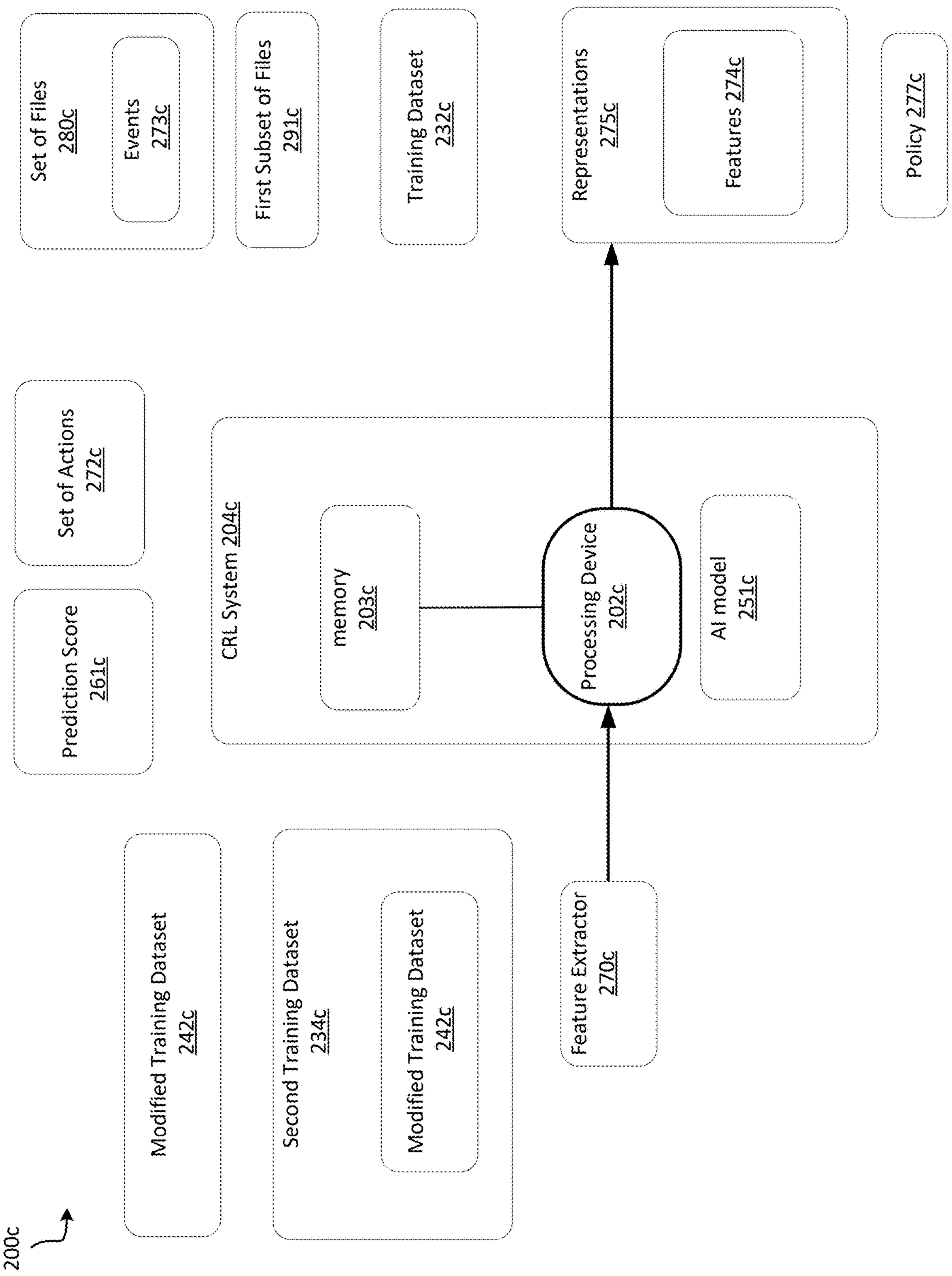
FIG. 2C is a block diagram depicting an example environment for using the CRL system 104 in FIG. 1, according to some embodiments.

FIG. 2C is a block diagram depicting an example environment for using the CRL system in FIG. 1, according to some embodiments. The system 204*c* (e.g., CRL system 104 in FIG. 1) includes a memory 203*c* and a processing device 202*c* that is operatively coupled to the memory 203*c*. The processing device 202*c* is configured to generate, based on a feature extractor 270*c*, a set of state representations 275*c* indicating features 274*c* (e.g., a file type, a file size, or a file creation date) of a set of files 280*c*. The CRL system 204*c* is configured to identify based on the set of state representations 275*c* and a policy 277*c*, a set of actions 272*c* that are respectively associated with the set of files 280*c*. The CRL system 104 is configured to select, based on the set of actions 272*c* and from the set of files 280*c*, a first subset of files 291*c* to generate a training dataset 232*c* including the first subset of files 280*a*. The CRL system 104 is configured to generate a prediction score 261*c* based on an AI model 251*c*, theoretically trained using the training dataset 232*c*, to detect events 273*c* associated with the set of files 280*c*. That is, in this embodiment, the AI model 251*c* is not actually trained with the training dataset 232*c*. The CRL system 204*c* is configured to modify the training dataset 232*c* based on the prediction score 261*c* to generate a modified training dataset 242*c*. In some embodiments, instead of generating a modified training dataset 242*c*, the CRL system 104 is configured to generate a second training data 234*c* that includes the modified training dataset 242*c* but not the training dataset 232*c*.

Figure 3:
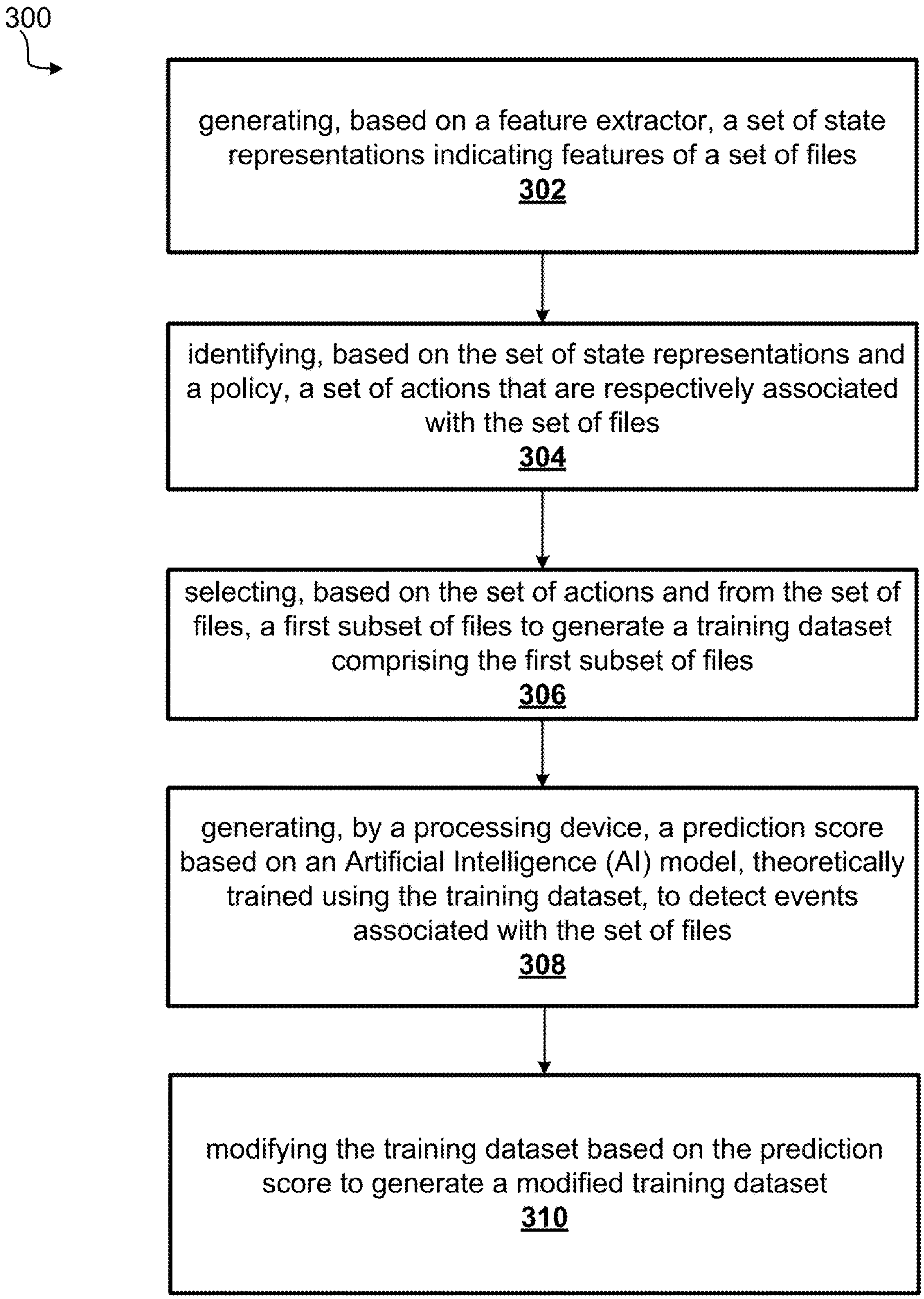
FIG. 3 is a flow diagram depicting a method of automating and optimizing corpus curation in a RL setting for artificial intelligence applications, according to some embodiments.

FIG. 3 is a flow diagram depicting a method of automating and optimizing corpus curation in a RL setting for artificial intelligence applications, according to some embodiments. Method 300 may be performed by processing logic that may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, method 300 may be performed by one or more components (e.g., RLA agent 106, evaluator 112, threat detection agent 108) of a Corpus Curation with Reinforcement Learning System 104, such as the CRL system 104 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of generating, based on a feature extractor, a set of state representations indicating features of a set of files. The method 300 includes the block 304 of identifying, based on the set of state representations and a policy, a set of actions that are respectively associated with the set of files. The method 300 includes the block 306 of selecting, based on the set of actions and from the set of files, a first subset of files to generate a training dataset including the first subset of files. The method 300 includes the block 308 of generating, by a processing device, a prediction score based on an AI model, theoretically trained using the training dataset, to detect events associated with the set of files. The method 300 includes the block 310 of modifying the training dataset based on the prediction score to generate a modified training dataset.

Figure 4:
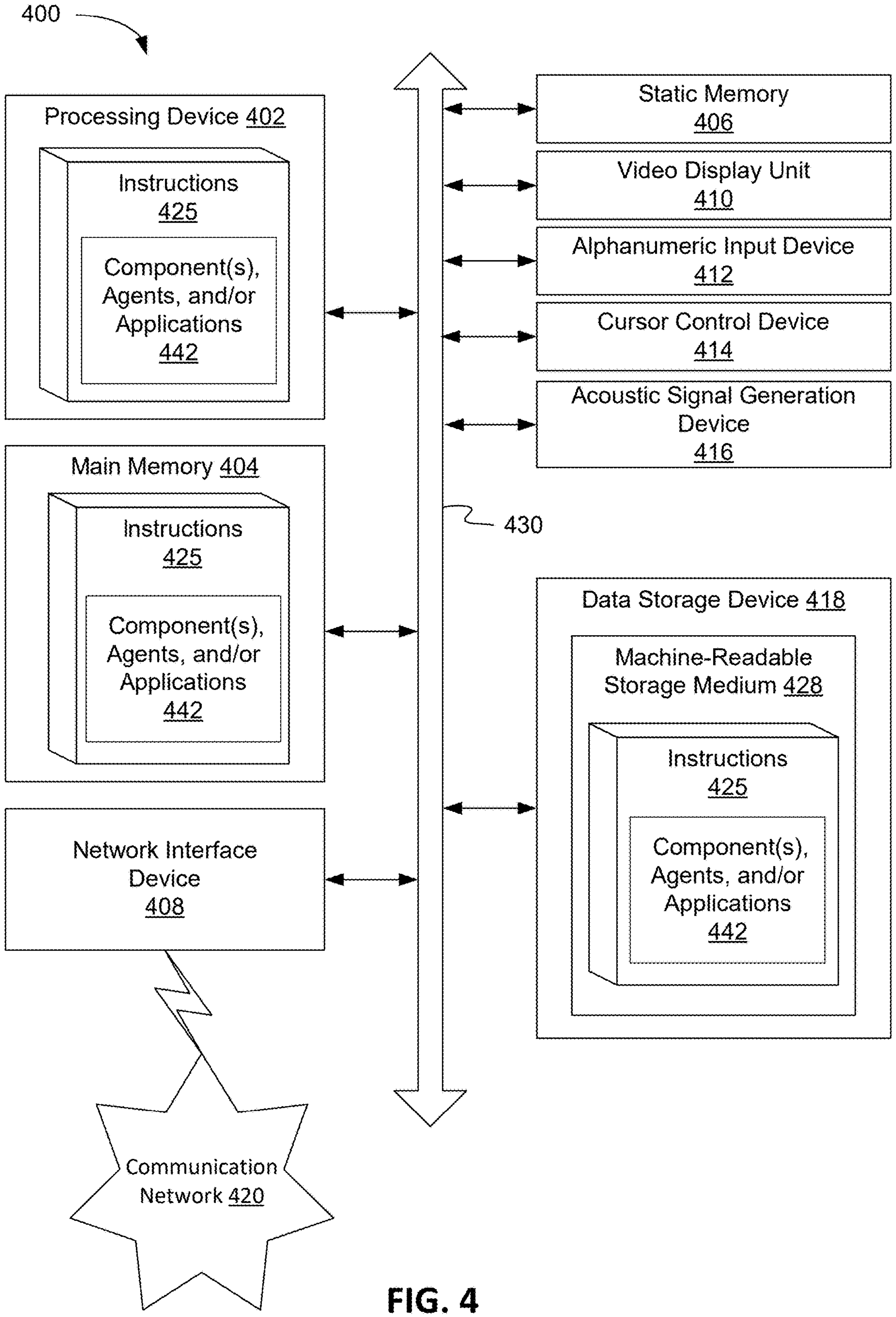
FIG. 4 is a block diagram of an example computing device that may perform one or more of the operations described herein, in accordance with some embodiments.

FIG. 4 is a block diagram of an example computing device that may perform one or more of the operations described herein, in accordance with some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general-purpose processor, a PLD, etc.) 402, a main memory 404 (e.g., synchronous dynamic random-access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also include one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components/programs/applications 442 (e.g., RLA agent 106, threat detection agent 108, AI models 109, evaluator 112, prediction score generator 113 in FIG. 2A, etc.) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "generating," "identifying," "selecting," "modifying," "updating," "determining," "calculating," "tagging," "training," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may include a general-purpose computing device selectively programmed by a computer program stored in the computing device. Such a computer program may be stored in a computer-readable non-transitory storage medium.

The methods and illustrative examples described herein are not inherently related to any particular computer or other apparatus. Various general-purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112(f), for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present embodiments to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present embodiments are not to be limited to the details given herein, but may be modified within the scope and equivalents of the appended claims.

What is claimed is:

1. A method of comprising:

generating, based on a feature extractor, a set of state representations indicating features of a set of files;

identifying, based on the set of state representations and a policy, a set of actions that are respectively associated with the set of files;

selecting, based on the set of actions and from the set of files, a first subset of files to generate a training dataset comprising the first subset of files;

generating, by a processing device, a prediction score based on a theoretical version of an Artificial Intelligence (AI) model that is theoretically trained using the training dataset, without actually training the AI model using the training dataset, to detect events associated with the set of files;

modifying the training dataset based on the prediction score to generate a modified training dataset by:

generating a similarity score between a first file and a second file of the first subset of files using a fuzzy hash, determining that the similarity score satisfies a similarity threshold value, and removing the first file from the training dataset in response to the determination;

determining a first performance of the AI model based on the training dataset;

determining a second performance of the AI model based on the modified training dataset;

calculating a performance difference between the first performance and the second performance; and identifying, based on the performance difference, at least one of a false positive or a false negative associated with the training dataset.

2. The method of claim 1, wherein modifying the training dataset based on the prediction score further comprises:

updating the policy based on the prediction score to generate an updated policy.

3. The method of claim 2, wherein modifying the training dataset based on the prediction score further comprises:

generating, based on the updated policy, an updated set of state representations indicating updated features of the set of files;

identifying, based on the updated set of state representations, an updated set of actions that are respectively associated with the set of files; and selecting, based on the updated set of actions and from the set of files, a second subset of files to generate the modified training dataset comprising the second subset of files.

4. The method of claim 1, further comprising:

training, using a second training dataset, the AI model to detect events associated with the set of files; and generating a second prediction score based on the AI model, and wherein modifying the training dataset based on the prediction score is further based on the second prediction score.

5. The method of claim 1, wherein generating the set of state representations further comprises:

generating, for a first file of the first subset of files, one or more features comprising at least one of a file type, a file size, or a file creation date.

6. The method of claim 1, wherein the set of actions comprise at least one of:

tagging a particular file of the set of files with a training tag, tagging the particular file of the set of files with a validation tag indicative of model quality;

tagging the particular file of the set of files with a testing tag, tagging the particular file of the set of files with an ignore tag, or sending the particular file of the set of files to one or more clustering Application Programming Interfaces (APIs) to generate additional information based on the particular file.

7. The method of claim 1, wherein modifying the training dataset based on the prediction score to generate the modified training dataset is further based on a processing time or an amount of memory.

8. A system comprising:

a memory; and a processing device, operatively coupled to the memory, to:

generate, based on a feature extractor, a set of state representations indicating features of a set of files;

identify, based on the set of state representations and a policy, a set of actions that are respectively associated with the set of files;

select, based on the set of actions and from the set of files, a first subset of files to generate a training dataset comprising the first subset of files;

generate a prediction score based on a theoretical version of an Artificial Intelligence (AI) model that is theoretically trained using the training dataset, without actually training the AI model using the training dataset, to detect events associated with the set of files; and modify the training dataset based on the prediction score to generate a modified training dataset by:

generating a similarity score between a first file and a second file of the first subset of files using a fuzzy hash, determining that the similarity score satisfies a similarity threshold value, and removing the first file from the training dataset in response to the determination;

determine a first performance of the AI model based on the training dataset;

determine a second performance of the AI model based on the modified training dataset;

calculate a performance difference between the first performance and the second performance; and identify, based on the performance difference, at least one of a false positive or a false negative associated with the training dataset.

9. The system of claim 8, wherein to modify the training dataset based on the prediction score, the processing device is further to:

update the policy based on the prediction score to generate an updated policy.

10. The system of claim 9, wherein to modify the training dataset based on the prediction score, the processing device is further to:

generate, based on the updated policy, an updated set of state representations indicating updated features of the set of files;

identify, based on the updated set of state representations, an updated set of actions that are respectively associated with the set of files; and select, based on the updated set of actions and from the set of files, a second subset of files to generate the modified training dataset comprising the second subset of files.

11. The system of claim 8, wherein the processing device is further to:

train, using a second training dataset, the AI model to detect events associated with the set of files; and generate a second prediction score based on the AI model, and wherein to modify the training dataset based on the prediction score is further based on the second prediction score.

12. The system of claim 8, wherein to generate the set of state representations, the processing device is further to:

generate, for a first file of the first subset of files, one or more features comprising at least one of a file type, a file size, or a file creation date.

13. The system of claim 8, wherein the set of actions comprise at least one of:

tag a particular file of the set of files with a training tag, tagging the particular file of the set of files with a testing tag, tag the particular file of the set of files with a validation tag indicative of model quality, tag the particular file of the set of files with an ignore tag, or send the particular file of the set of files to one or more clustering Application Programming Interfaces (APIs) to generate additional information based on the particular file.

14. A non-transitory computer-readable medium storing instructions that, when executed by a processing device, cause the processing device to:

generate, based on a policy, a set of state representations indicating features of a set of files;

identify, based on the set of state representations, a set of actions that are respectively associated with the set of files;

select, based on the set of actions and from the set of files, a first subset of files to generate a training dataset comprising the first subset of files;

generate, by the processing device, a prediction score based on an Artificial Intelligence (AI) model that is theoretically trained using the training dataset, without actually training the AI model using the training dataset, to detect events associated with the set of files;

modify the training dataset based on the prediction score to generate a modified training dataset by:

generating a similarity score between a first file and a second file of the first subset of files using a fuzzy hash, determining that the similarity score satisfies a similarity threshold value, and removing the first file from the training dataset in response to the determination;

determine a first performance of the AI model based on the training dataset;

determine a second performance of the AI model based on the modified training dataset;

calculate a performance difference between the first performance and the second performance; and identify, based on the performance difference, at least one of a false positive or a false negative associated with the training dataset.

15. The method of claim 1, further comprising:

measuring a processing time associated with the AI model to process the first subset of files, or calculating an amount of memory used by the AI model to process the first subset of files.

16. The system of claim 8, wherein the processing device is further to:

measure a processing time associated with the AI model to process the first subset of files; and calculate an amount of memory used by the AI model to process the first subset of files.

* * * * *